United States Patent [19]

Baer et al.

[11] Patent Number: 4,875,096

[45] Date of Patent: Oct. 17, 1989

[54] ENCODING OF AUDIO AND DIGITAL SIGNALS IN A VIDEO SIGNAL

[75] Inventors: Ralph H. Baer, Manchester, N.H.; Kenneth J. Curran, Redondo Beach; Jay Smith, III, Los Angeles, both of Calif.

[73] Assignee: Smith Engineering, Culver City, Calif.

[21] Appl. No.: 898,268

[22] Filed: Aug. 20, 1989

[51] Int. Cl.⁴ .............................. H04N 7/04
[52] U.S. Cl. ..................... 358/143; 358/147
[58] Field of Search ................. 358/142–147, 358/343; 360/19.1, 27; 375/24

[56] References Cited

U.S. PATENT DOCUMENTS

| | | | |
|---|---|---|---|
| 3,492,432 | 1/1970 | Schinpf | 375/24 |
| 3,549,795 | 12/1970 | Mullin | 178/5.6 |
| 3,666,888 | 5/1972 | Sekimoto | 178/69.5 TV |
| 3,859,458 | 1/1975 | Takezawa et al. | |
| 3,900,887 | 8/1975 | Soga et al. | 358/142 |
| 3,902,007 | 8/1975 | Justice | 178/5.8 R |
| 3,916,092 | 10/1975 | Justice | 358/12 |
| 3,988,528 | 10/1976 | Yanagimachi et al. | |
| 4,134,127 | 1/1979 | Campioni | 358/16 |
| 4,233,627 | 11/1980 | Sugihara | 358/143 |
| 4,318,125 | 5/1982 | Shutterly | 358/145 |
| 4,321,623 | 3/1982 | Rzeszewski | 358/144 |
| 4,367,488 | 1/1983 | Leventer et al. | 358/147 |
| 4,394,690 | 7/1983 | Kobayashi | 358/180 |
| 4,479,150 | 10/1984 | Ilmer et al. | 358/310 |
| 4,569,026 | 2/1986 | Best | |
| 4,602,295 | 7/1986 | Moriyama et al. | 360/19.1 |
| 4,652,919 | 3/1987 | Devino | |
| 4,665,431 | 5/1987 | Cooper | 358/143 |
| 4,786,967 | 11/1988 | Smith, III et al. | 358/143 |

FOREIGN PATENT DOCUMENTS 0003247  1/1980  Japan ..................... 358/142

Primary Examiner—James J. Groody
Assistant Examiner—David E. Harvey
Attorney, Agent, or Firm—Price, Gess & Ubell

[57] ABSTRACT

Audio signals and digital commands are encoded into a standard raster format television signal recorded on a casette for play by a home video cassette unit. The audio signals are encoded in the displayable video as modulated carrier pulses separated by return to median intervals with the audio waveforms being tapered near discontinuities. The digital commands are recorded as binary level pulses, one such pulse occupying substantially an entire video line to permit accurate decoding.

4 Claims, 11 Drawing Sheets

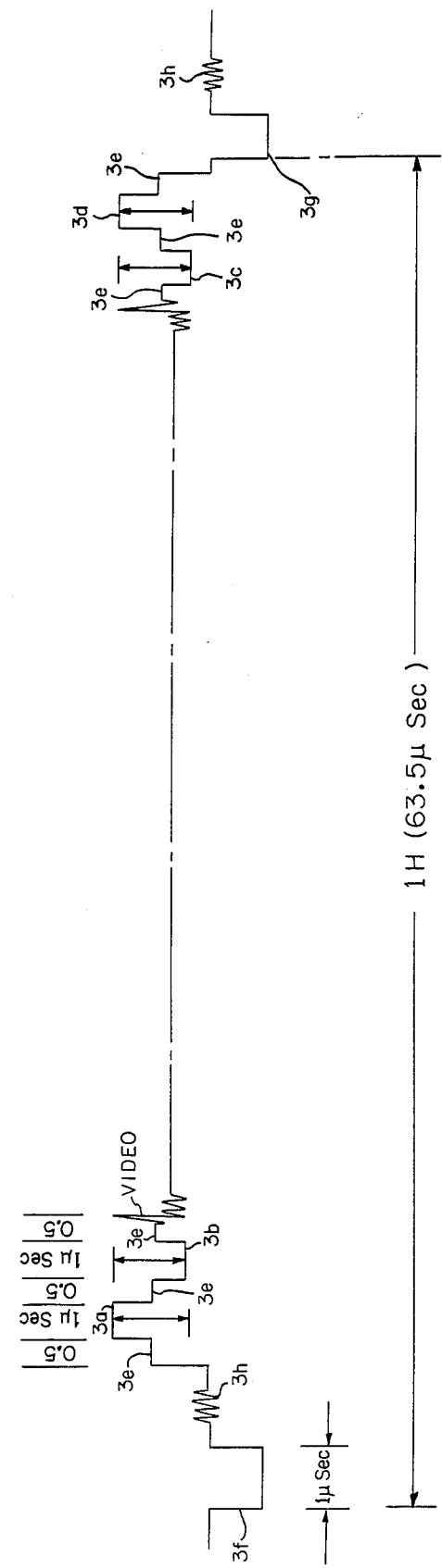

ENCODING OF AUDIO AND DIGITAL SIGNALS IN A VIDEO SIGNAL

BACKGROUND OF THE DISCLOSURE

The subject invention relates to signal encoding and more particularly to encoding of audio signals and digital commands on a video signal such as may be transmitted to standard television receivers.

In the prior art, techniques have been suggested for encoding audio signals in conjunction with a raster scan format television signal. In general, these techniques prove unsatisfactory for use in consumer oriented products because of the implementation expense involved or because degradation of the video signal in application precludes satisfactory recovery of the transmitted sound or data.

Both of the foregoing factors are exacerbated when encoding a video signal which is to be reproduced by a typical video cassette recorder (VCR) in the playback mode. The available bandwidth of consumer quality VCR's is on the order of 2.5 megahertz. We have found that this bandwidth eliminates a number of apparently feasible encoding methods, particularly those relying on various forms of modulating the audio signals onto chroma frequency subcarriers, see Justice U.S. Pat. No. 3,916,092.

Other obstacles to acceptable sound reproduction arise from the characteristics of a typical raster scan format signal. For example, the vertical sync interval introduces signal discontinuities into the sample audio signal train. These discontinuities give rise to spikes and noise created by modulation with harmonics of the 60 Hz vertical field rate, resulting in unacceptable audio reproduction. Heretofore, persons skilled in the art have suggested that compression/decompression techniques would be called for to overcome the problems presented by the vertical interval gap.

Another complicating factor in the case of a system for branching to various audio tracks is the necessity to provide for transmission and selective decoding of signals corresponding to one of four or more desired channels or tracks. This multiplicity of encoding audio signals places additional time constraints on any encoding and sampling process, particularly since the encoded audio signal trains must be prevented from encroaching excessively upon viewable picture space within the video signal. Furthermore, it is desirable to additionally insert digital data commands into the video information along with audio segments in order to permit interaction between the viewer and a microprocessor controller.

SUMMARY OF NOVEL ASPECTS OF THE INVENTION

It is therefore an object of the invention to provide an improved technique for transmitting audio in a video waveform.

It is a concomitant object to provide an improved format for encoding audio channels into a video signal.

It is another object of the invention to provide an overall encoding/decoding scheme which is simple, inexpensive and overcomes the obstacles to acceptable reproduction and branching control experienced by complex automatic branching systems of the prior art.

It is a further object of the invention to provide an overall encoding/decoding scheme which is applicable to limited bandwith storage media and apparatus, such as presently existing consumer quality VCR's.

It is another object of the invention to provide a format and encoding method for multiple audio signals, as well as digital commands required to effect controlled branching to one of the audio signals at any given time.

In accordance with the invention, a pair of pulses are inserted at the left and right vertical edges of the that portion of each horizontal scan line extending from the end of color burst to the beginning of the next horizontal sync pulse of a standard raster-format television picture. Each signal pulse in these pulse pairs is amplitude modulated with the instantaneous value of an audio signal during the encoding process. Upon playback, the decoding process recovers the audio signals by a sample hold method of decoding. To prevent intermodulation between adjacent pulse pairs, suitable return-to-median levels are interpersed between the pulses. Furthermore, to minimize the effect of the vertical blanking gap, the encoding of audio is tapered or otherwise modified just preceding and forwarding the vertical blanking pulse intervals. These features contribute to successful recovery of usable audio, with the implementation of the sample and hold decoding function being under control of a microprocessor. Encoding of digital data required by the processor into the video signal is accomplished by placing the data in the first several lines following the vertical blanking interval.

The foregoing description is directed to novel aspects of this disclosure, the elements of the invention being set forth with precision in the claims appended hereto.

The foregoing remarks are intended to highlight various aspects of the invention as a preface to the detailed discussion of the preferred embodiment. The invention is defined with particularity in the claims appended hereto.

BRIEF DESCRIPTION OF THE DRAWINGS

The preferred embodiment and best mode of implementing the claimed invention will now be described in conjunction with the drawings, of which:

FIG. 3 is a waveform diagram showing audio channels embedded in a video signal;

FIG. 5 is a circuit diagram illustrating in more detail the cursor generation and control logic of the preferred embodiment;

DETAILED DESCRIPTION OF THE PREFERRED EMBODIMENT

Figure 1:
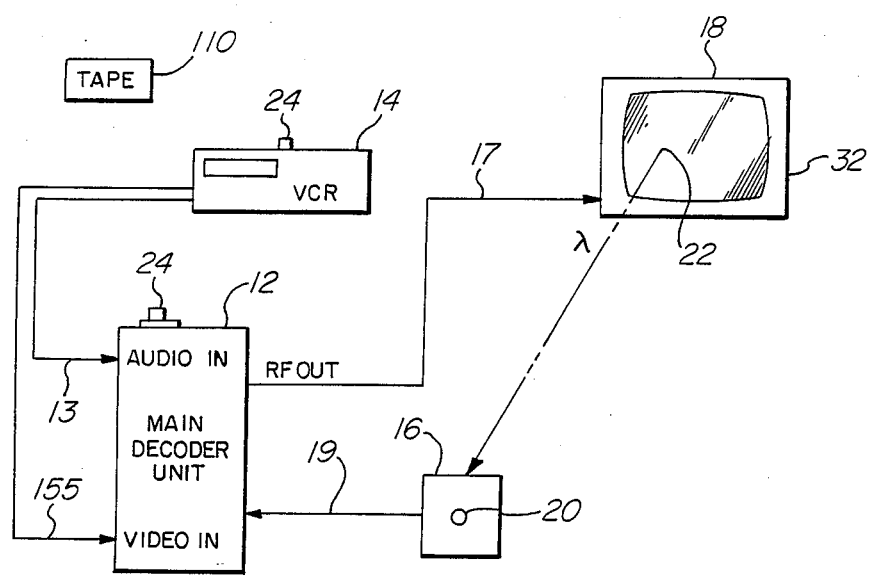
FIG. 1 is a schematic block diagram illustrating a system employing the preferred embodiment.

As shown in FIG. 1, the preferred embodiment includes a main decoding unit 12 connected between a video recorder (VCR) 14 and a hand-held controller/sensor 16. In operation, the use interacts with the images on a screen 18 of a television 32 by pointing the controller 16 at the screen 18 and pressing a button 20 when a movable on-screen cursor 22 aligns with the user's selected choice. While referenced as a "video recorder" at times herein, it will be appreciated that the recording function of the VCR 14 is not important to the subject invention but rather only the "play back" feature.

The unit 12 employs signals from the tape 110 in the VCR 14 and its own internal programming to respond to the user's selection in a number of ways. For example, the unit 12 can transmit an audible "yes" or "no" indication to the television receiver in response to the position of the cursor 22 at the moment of depression of the button 20. The user's selection can also cause the unit 12 to institute a branch to one of five audio channels, or blank part of the television screen 18.

The unit 12 further provides not only an audio and/or video indication of a correct response, but also permits verbal and visual explanations of incorrect responses. The unit 12 may further track successive responses and accumulate data necessary to provide an evaluation such as a score at the end of a selected program segment.

There are two connections 13, 155 between the decoder 12 and the video recorder 14. These are video-in 155 and audio-in 13 provided, for example, by suitable shielded cables. RF-out is provided to the television receiver 32 by a standard coaxial connector 17.

The controller 16 is connected to the decoder 12 via a four-pin connector 19. The preferred embodiment is powered by a wall-mounted, low-voltage DC output power supply. Power is connected to the decoding 12 via a coaxial DC connector.

The decoder 12 has one top-accessed long throw slide switch 24 which controls both power and an RF switch. When off, the RF from the recorder 14 is connected to the receiver of the television 32. The button 20 of the controller 16 is a tactile feedback switch.

Figure 9:
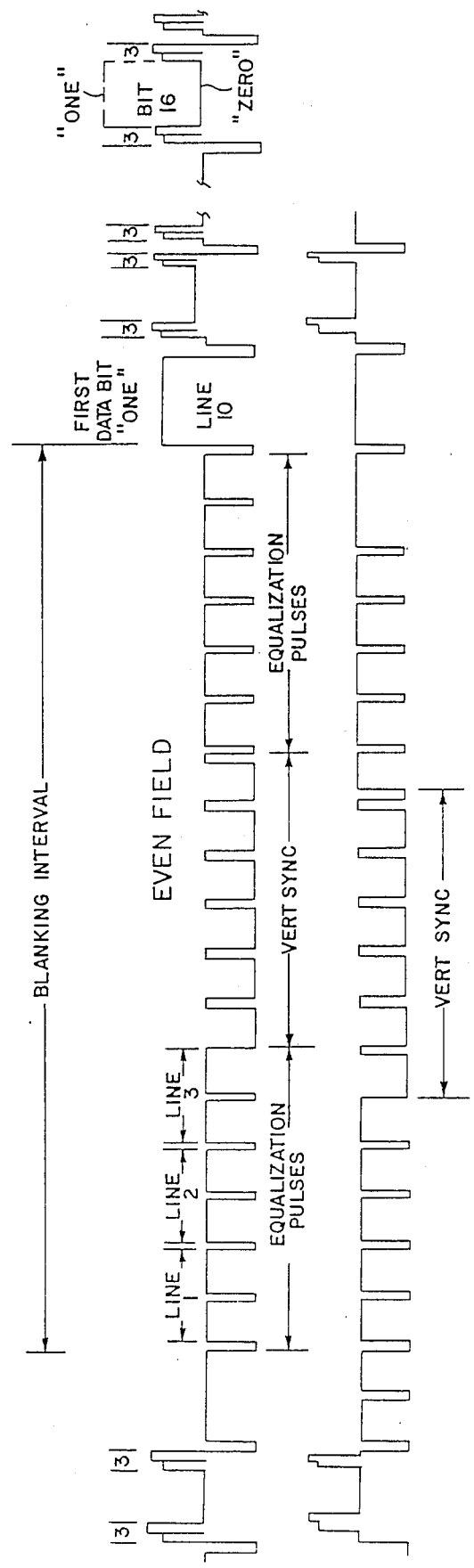
FIG. 9 is a timing diagram illustrating placement of digital commands according to the preferred embodiment.

The decoder unit 12 processes both the output signal of an optical sensor (FIG. 2) and a video signal containing nested audio (FIG. 3) and digital commands (FIG. 9.) These signals and their generation will now be described as a preface to detailed discussion of the decoding circuitry.

In order for a pointing device such as the controller/sensor 20 to be effective when used at a significant distance from the television receiver, a method of visual feedback is provided. The preferred embodiment generates a cursor 22 on the screen 18 in a position relative to the sensed position of the raster scanning spot on the screen of the television receiver.

Figure 2:
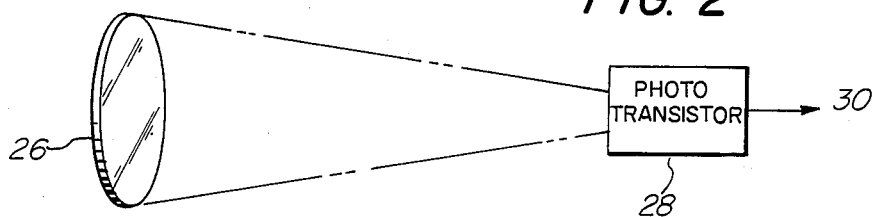
FIG. 2 is a schematic diagram illustrating the optical sensor of the preferred embodiment.

As shown in FIG. 2, the hand-held probe 16 contains an optical system including a single lens element 26, which images a portion of the television screen 18, and hence the raster scan spot, onto a phototransistor 28. This phototransistor 28 may be an OPT500.

Figure 2A:
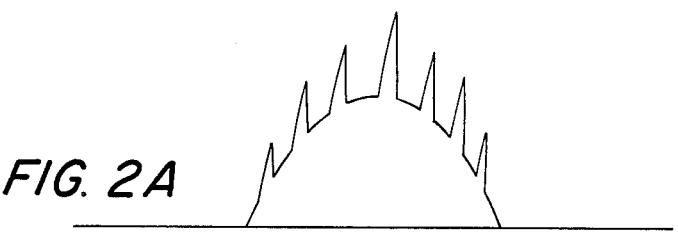
FIG. 2a and 2b illustrate waveforms related to the optical sensor output.
Figure 2B:
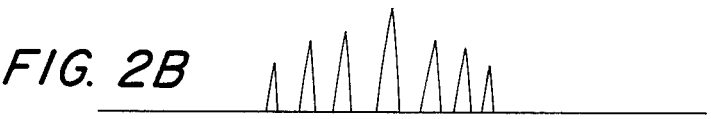

The lens 26 is arranged to focus a circular screen area approximately one inch in diameter onto the television screen on a 13 inch set at a distance of five feet. The resultant output 30 of the phototransistor 28 appears as a series of pulses on a 60 Hz component, the pulses having a frequency of 15734.263 Hz for a standard U.S. color set. This output 30 is illustrated in FIG. 2a. The output 30 is then filtered to provide a pulse train as shown in FIG. 2b. If the photodetector surface area is circular, the pulses of the pulse train will typically increase in amplitude as further shown in FIG. 2b. It is therefore preferable to use one of the later pulses, e.g. the seventh, for subsequent operations.

Because the rise time of the phototransistor 28 is quite slow, the timing of the transitions in the pulses of FIG. 2b varies significantly with screen brightness and spot position on the phototransistor 28. With a typical rise time of 8 microseconds, a significant portion of the left side of the screen 18 could not be used if the cursor 22 were generated at the time of the transition in the output 30 of transistor 28. This problem is corrected in the decoder unit 12 as discussed in more detail hereafter.

The audio system consists of six processor-selectable audio sources. The first source is a direct output from a microprocessor 15 (FIG. 5b) which is used to generate preprogrammed tone sequences or melodies for correct/incorrect answers, providing immediate response to the user's choice. The second source is derived from a direct connection to the audio output 13 of the VCR 14. The audio output 13 delivers signals stored on the standard audio track of the video tape.

Figure 10:
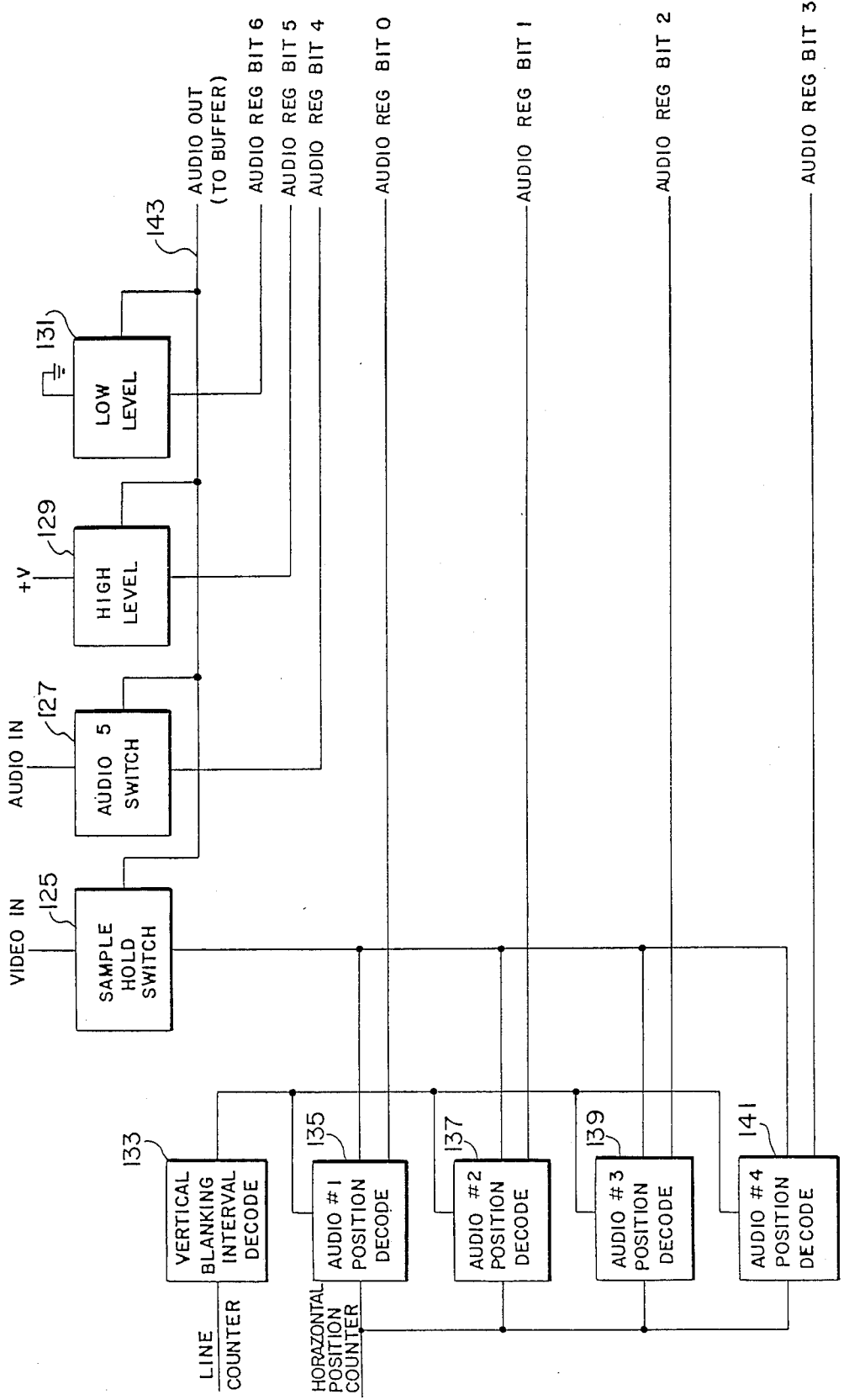
FIG. 10 is a block diagram illustrating the audio decode logic of the preferred embodiment.

The other four audio sources are extracted from four amplitude-modulated pulses encoded or "nested" in the video scan according to a technique illustrated in FIG. 3. These signals are extracted by applying a selected single train of them to a fast sample and hold circuit, which is then followed by a low pass filter. The circuitry used is shown in FIG. 10 and described in more detail in connection with that figure.

FIG. 3 illustrates the nested audio pulses. The waveform of FIG. 3 covers a single horizontal sweep (line) period lasting from the beginning of horizontal sync pulse 3$ff$ to the start of the next horizontal sync pulse 3$g$, or approximately 63.5 microseconds in the U.S. NTSC format. The sync pulse 3$f$ is followed by a chroma burst 3$h$, which consists typically of about ten cycles at 3.579545 MHz. The chroma burst signal 3$h$ is followed by four pulses indicated in the FIG. as 3$a$, 3$b$, 3$c$, and 3$d$, respectively. The first two pulses 3$a$, 3$b$ are separated by video from the last two pulses 3$c$, 3$d$. The pulses vary through a range of amplitudes, as indicated by the arrows in FIG. 3, reaching maximums near the white level and minimums near the black level. The pulses 3$a$ and 3$b$ are preceded and succeeded by one-half microsecond return-to-median intervals 3$e$. These intervals 3$e$ reduce intermodulation distortion by separating the adjacent pairs of amplitude modulated sound pulses. The one microsecond pulse 3$a$, 3$b$, 3'c, 3$d$ represent the four nested audio channels, and are each amplitude modulated by a different audio signal. Since the pulses 3$a$, 3$b$, 3'c, 3$d$ occur at the horizontal sync/scan rate of 15,734 Hz, they can readily be amplitude modulated with audio signals up to approximately 5 kHz, since that is well below the minimum 2:1 Nyquist ratio.

According to the preferred embodiment, no audio pulses are encoded during the vertical sync period.

Audio pulses do occur during the vertical blanking interval and beyond, but are masked by a "video border" generated by unit 12 to prevent portions of them from appearing as intensity modulated bars at the left and right edges of the television picture.

Figure 4A:
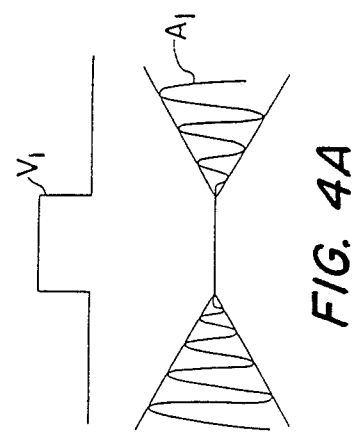
FIG. 4a illustrates a technique for pre-encoding audio signals.
Figure 4:
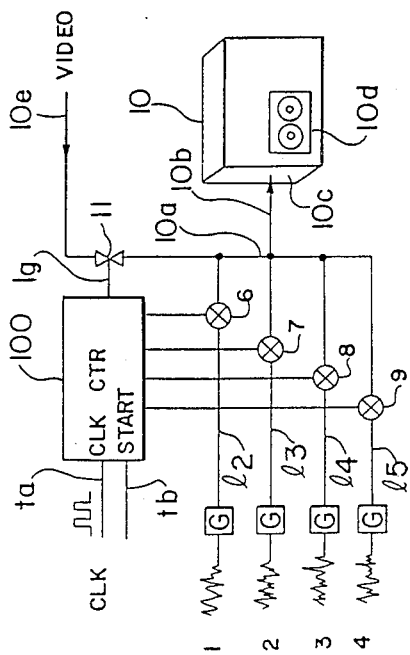
FIG. 4 illustrates apparatus for modulating a multiplicity of audio signals onto a video signal.

FIG. 4 depicts a block diagram of circuitry for generating a waveform such as that shown in FIG. 3. This circuitry places four prerecorded audio sources, e1 through e4, on a video cassette 10d. The four audio sources e1 . . . e4 are applied to respective amplitude modulators 6, 7, 8, and 9. These modulators 6, 7, 8, 9 are driven by a single pulse from counter 100 at the proper time with respect to the prior horizontal sync signal on line tb, which starts the counter 100. The counter 100 is clocked by signals on line ta to produce the proper time relationships and pulse width required to generate the pulses referred to as 3a, 3b, 3c and 3d in FIG. 3. It is the function of amplitude modulators 6, 7, 8 and 9 to deliver a single pulse to line 10b whose peak value corresponds to the instantaneous level of the applied audio waveforms e1, e3, e3 and e4, respectively. Counter 100 also enables an analog transmission gate 11 via line 1g at the appropriate time so as to permit an external video signal to enter from line 10e.

Thus, the signal on line 10b represents alternately external sync and color burst signals, from line 10e, two nested audio pulses from the modulators 6,7 followed by external video signal 10e, and then, two nested audio pulses, from modulators 8 and 9, followed by the next horizontal sync pulses and so forth.

It is to be noted that the counter arrangement shown in FIG. 4 is only representative of various circuit embodiments which could be used to produce properly-timed pulses. Moreover, to reduce audio distortion in the preferred embodiment, due to the lack of amplitude—modulated pulses during the vertical sync interval, it is preferred to make the instantaneous audio waveform ending levels equal to their starting level at the beginning of the next field. This is done during the encoding process by preconditioning of the audio signals to be encoding. The method of preconditioning in the preferred embodiment is to taper the audio signal A1 just prior to the start of the vertical sync pulse V1 as illustrated in FIG. 4A. Such a waveform may be achieved in FIG. 4 by subjecting each source e1, e2, e3, e4 to a linearly decreasing gain adjustment G triggered in anticipation of the vertical sync pulse V1 and a linearly increasing gain adjustment G triggered to begin at the end of the pulse V1. Such a gain adjustment may be made by inputting the audio signal e1 etc. to a signal multiplier such as the AD 7523KN which multiplies the signal by an input count. An up/down counter then supplies the input to the multiplier at the appropriate time to generate the tapered audio waveform. Other, more sophisticated computer prediction methods may also be employed to reduce the 60 Hz vertical sync interval transient disturbance of the otherwise contiguous audio signals.

Figure 5A:
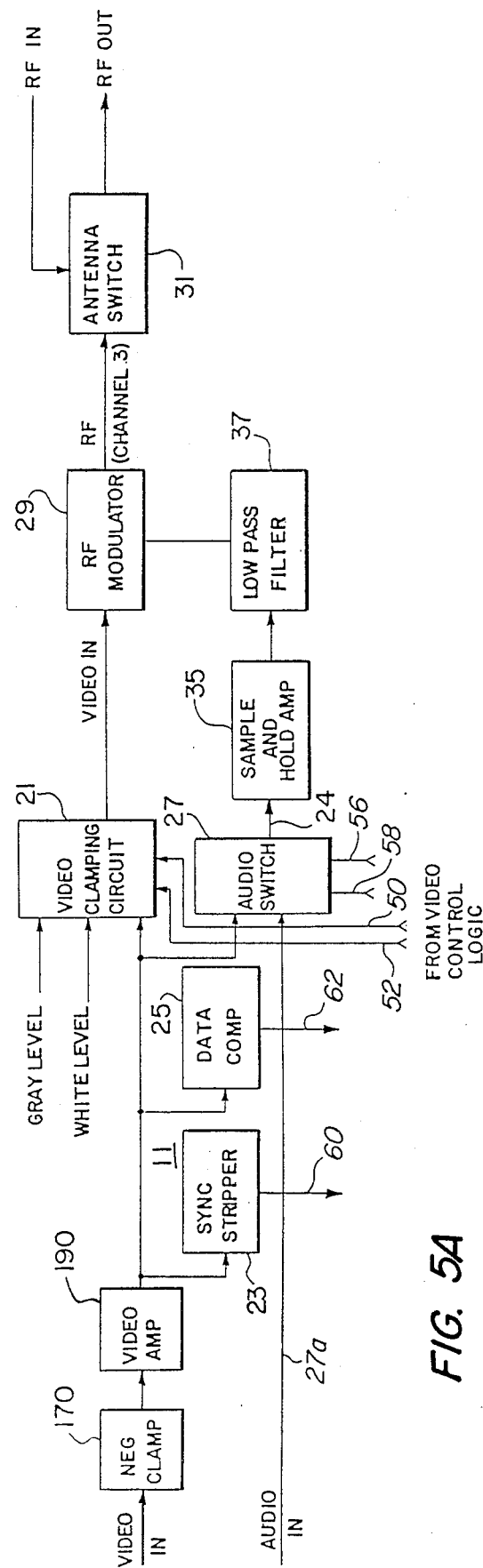
FIG. 5a and 5b are schematic block diagrams illustrating the functional elements of the decoder unit of the preferred embodiment.
Figure 5B:
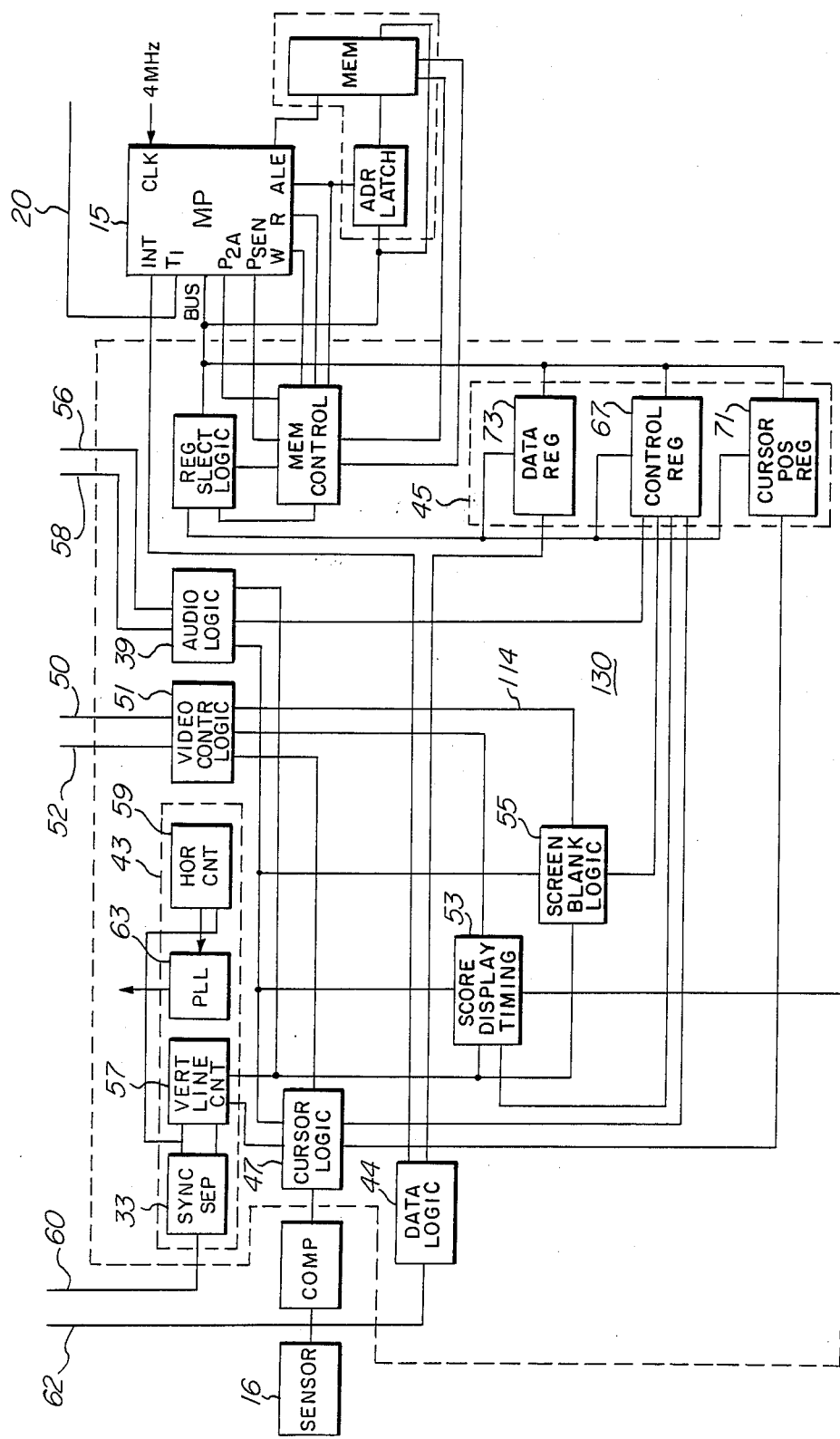

As indicated above, the optical sensor-generated signal and nested audio signal just described in connection with FIGS. 2-4a are supplied to the decoder unit 12. The preferred embodiment of the decoder unit 12 includes three major sections: the analog section 11 (FIG. 5a), the digital section 130 and the microprocessor 15 (FIG. 5b). Each section is described in detail in the following discussion.

The analog section 11 (5a) contains the video, audio and opto-electronic sections of the preferred embodiment. The video signal "video-in" from the VCR 14 is passed through a negative clamping circuit 170, which establishes the DC reference voltage of the sync pulses.

The video signal is then amplified in the video amplifier stage 190 and directed to four other circuits: a video clamping circuit 21, a sync stripper 23, a data comparator 25 and an audio sampling switch 27.

In the video clamping circuit 21, the video signal is processed. The signal is allowed to pass unmodified or is set to one of two fixed levels under control of the digital section 13, FIG. 5b. The levels are:

1. A fixed gray level corresponding to a 10% luminance level used for background for the score and cursor displays and the quadrant and border blanking.

2. A white level used for the cursor and score displays. A standard 11-Volt P-P input is assumed for establishing the blanking, gray (10%) and white levels.

The output signal of the video clamping circuit 21 is then fed to an RF modulator 29 to amplitude modulate the channel three RF oscillator of the modulator 29. The output of the RF modulator 29 is fed to an antenna switch 31 (24 in FIG. 1), which allows the user to select the television 32 as the input source.

The sync stripper 23 detects sync pulses in the video signal and passes the sync signal to the sync separator 33 of the digital section 13.

Figure 7:
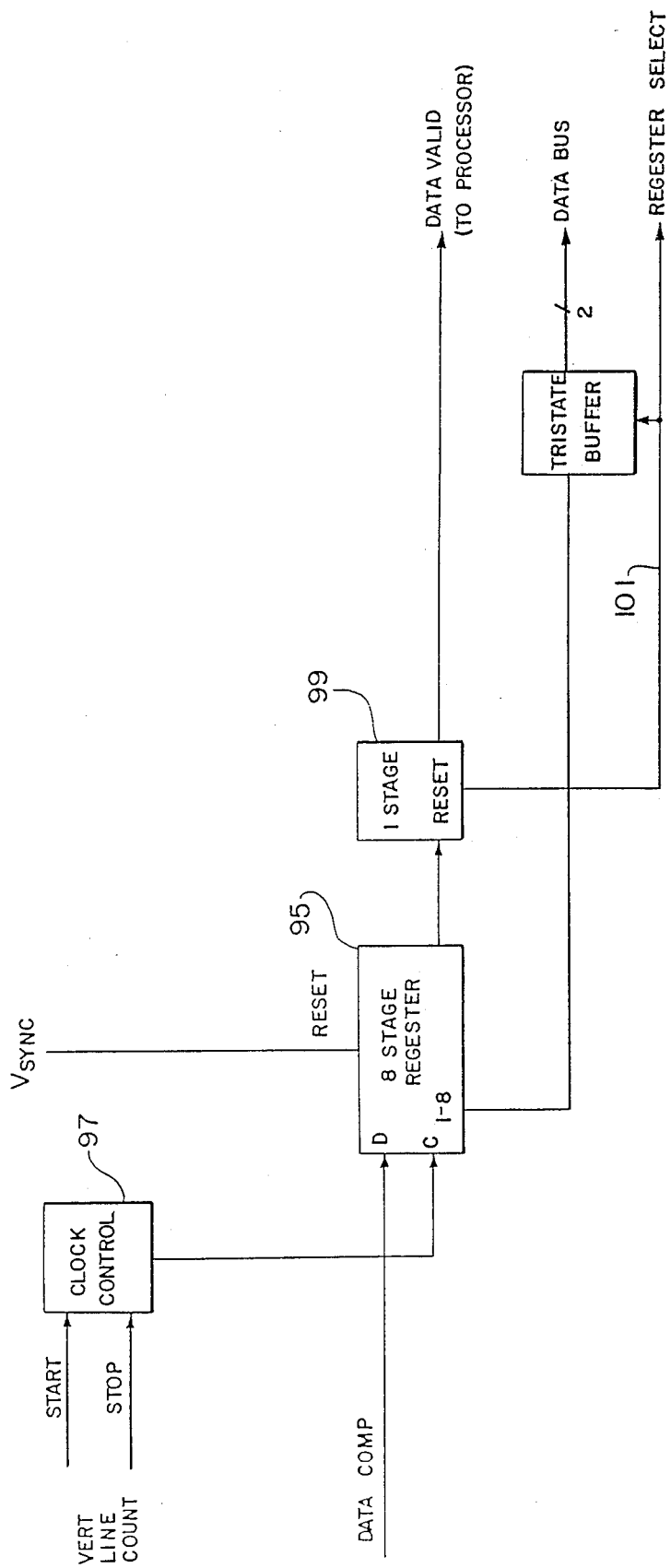
FIG. 7 is a circuit block diagram of the data logic of the preferred embodiment.

The data comparator circuit 25 converts the video signal to a digital signal corresponding to a "one" for a white level and a "zero" for a black level. The threshold of the comparator circuit 25 is set to a 50% luminance level of the vertical signal so that any video signal exceeding 50% is interpreted as a "one". The digital output of the data comparator 25 contains digital commands ultimately transmitted to the microprocessor 15 by the data logic 44 of FIG. 5b, shown in detail in FIG. 7.

The audio sampling switch 27 selects and decodes one of the four nested audio signal. The analog switch 27 provides an input 24 to a sample/hold amplifier 35, which in turn outputs to a low pass (5 kHz) filter 37. The input 24 to the sample/hold amplifier 35 is selected by the audio logic 39 of the digital section 130. The input 34 can be one of four sampled levels of the nested audio, the main audio track of the VCR 14, or a processor-generated series of tones delivered on line 58. The output of the low pass filter 37 is fed to the RF modulator 29 to frequency modulate the audio subcarrier of the modulator 29.

The digital section 130 of FIG. 5b is divided into the following areas:

1. Timing section 43
2. Microprocessor interface section 45
3. Cursor logic 47
4. Data logic 44
5. Video blanking logic 57
6. Audio logic 39

The digital section 130 is designed to perform all of the time dependent functions associated with the vertical display.

The timing section 43 includes the sync separator circuit 33 which separates the vertical and horizontal sync pulses in the input from the VCR 14 on line 62, a nine-stage line counter 57 locked to the vertical sync pulses, and a nine-stage horizontal position counter 59 locked to the horizontal sync pulses. The counters 57, 59 maintain the effective position of the raster scan beam on the television screen. They are used by the other logic sections for timing Timing is controlled by a phase-locked timing generator 63 including a basic 4 MHz clock. The generator 63 includes a phase lock loop reset on each vertical pulse. The end count of the loop is compared against the count of the horizontal counter 59. If required, the clock frequency is adjusted to give 255 counts per horizontal period. By phase locking to the pulses themselves, the time shift caused by the output signal instability of the playback unit 14 is accomodated. Otherwise, a much higher clock frequency would be required and would still be subject to error.

To illustrate, with a free running 4 MHz clock, the timing error would be 250 nanoseconds (ns) or = ½ the width of the pulses 3a, 3b, 3c, 3d encoding the audio channels. Such jitter in audio decoding is unacceptable. Therefore, total jitter is phase lock corrected at 15 KHz and the effort is reduced to about 40 ns.

In the embodiment disclosed, the micro-processor 15 is an Intel 8048 series processor, and the interface 45 is specific to that device. The 8048 provides for data memory expansion using the data port, with address and data transferred over a common bus. The interface section 45 consists of four eight-bit registers used for control and data transfer. These registers are:

| Location Hex | Register |
|---|---|
| 00 | Video control register 67 |
| 01 | Audio control register 67 |
| 02 | Cursor position register 71 |
| 03 | Data register 73 |

The video and audio control registers are indicated as a single block 67 in FIG. 5b.

The video control register 67 is write-only and has the following functions:

| Bit | |
|---|---|
| 0 | 1 = Quadrant 1 Blanked |
| 1 | 1 = Quadrant 2 Blanked |
| 2 | 1 = Quadrant 3 Blanked |
| 3 | 1 = Quadrant 4 Blanked |
| 4 | 1 = Border On |
| 5 | 1 = Cursor On |
| 6 | 1 = Cursor Hold |
| 7 | 1 = Score Display On |

The audio control register 67 is write-only and has the following functions:

| Bit | |
|---|---|
| 0 | 1 = Audio channel 1 (first video position) |
| 1 | 1 = Audio channel 2 |
| 2 | 1 = Audio channel 3 |
| 3 | 1 = Audio channel 4 |
| 4 | 1 = Audio channel 5 (main audio from VCR) |
| 5 | 1 = high output for processor tones |
| 6 | 1 = low output for processor tones |
| 7 | Unused |

The cursor position register 71 is a read-only register and consists of the high nibble of both horizontal and vertical cursor positions arranged as follows:
high nibble = Vertical position
low nibble = Horizontal position The data register 73 is a read-only register containing digital data down-loaded from the VCR 14 through the data logic 44. Accompanying this register 73 is a flag from the data logic 44 indicating "data present," which is directly connected to the interrupt input Int of the processor 15. The flag is reset after a read of data from the data register 73. Another input to the microprocessor 15 comes from the cursor button 20 and is shown connected to the input T1, which enables the button output to be polled by the microprocessor 15.

Figures 6, 6A:
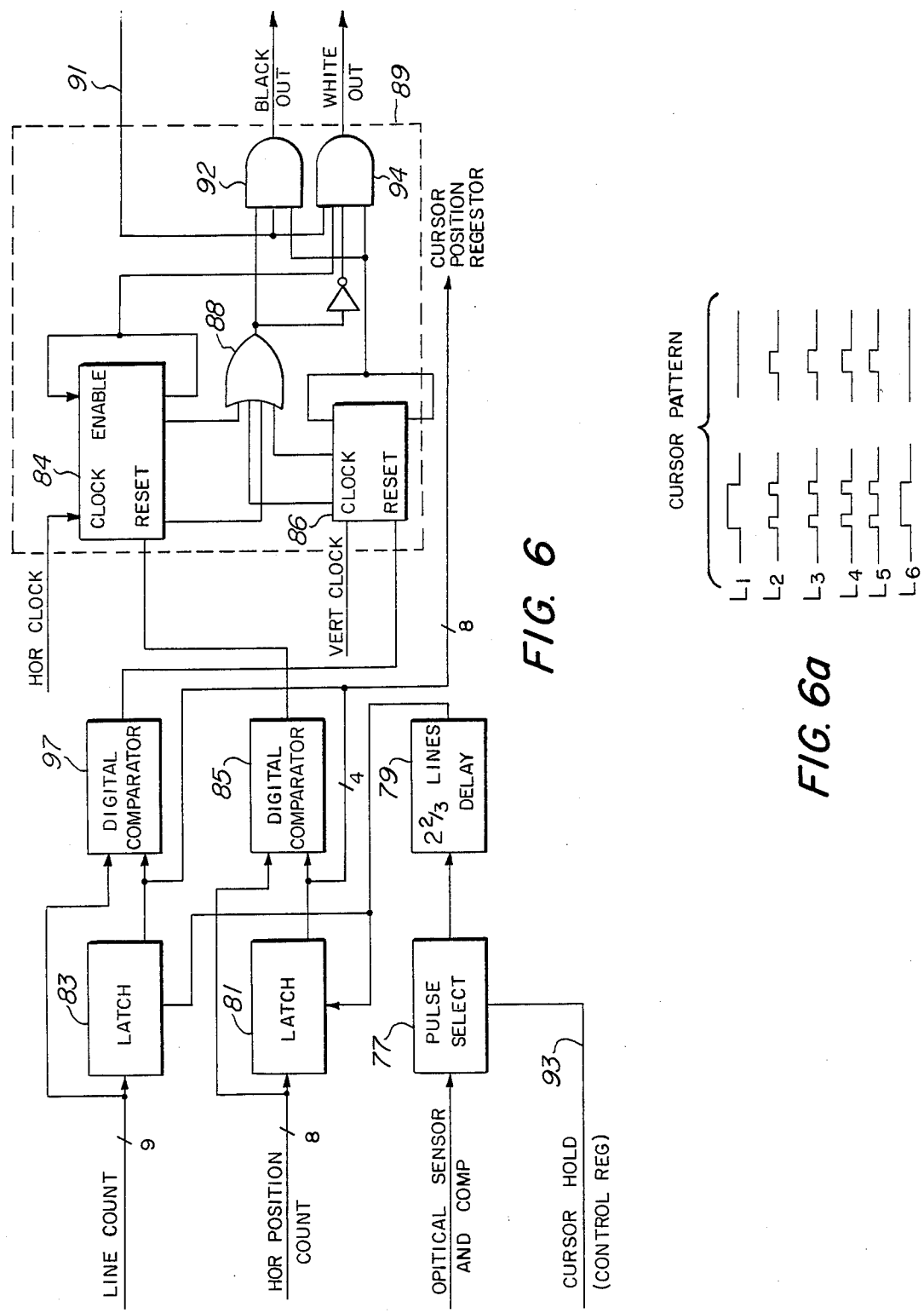
FIG. 6a depicts waveforms further illustrative of the cursor generation.

The digital circuitry of FIG. 5b further includes cursor logic 47 which cooperates in generating the cursor 22 on the television screen 18. The cursor logic 47 (FIG. 5b) is shown in detail in FIG. 6. It includes pulse select logic 77 which gates the seventh input pulse (FIG. 2b) from the optical sensor 41 after the vertical sync pulse. This seventh pulse starts a two and two-thirds line delay 79. This delay ensures that the cursor generator does not interfere with incoming data which indicates the cursor position. Rise time of the detector of approximately 8 microseconds must also be accounted for. Otherwise, the cursor may appear where the position is sensed on the next frame causing an undesirable visual jump of the cursor.

The output signal of delay element 79 triggers a latch 81 and a latch 83 used, respectively, to latch the counts of the line counter 57 and horizontal position counter 59 (FIG. 5b). This latched count defines the point at which the first line of the cursor is generated. When the latches 81, 83 are triggered, their contents match the respective line and horizontal position counts, causing a positive output (match detection) from each of two comparators 85, 87. The comparator outputs are provided to a signal generator 89.

The signal generator 89 includes first and second counters 84, 86, a quad input OR gate 88, first and second AND gates 92, 94 and an inverter 90. The OR gate 88 receives inputs from the 0 and 6 outputs of each of the counters 84, 86. The AND gate 92 receives an input from the output of the OR gate 88 and from the 7 output of the counter 86. The AND gate 94 receives inputs from the 7 outputs of both counters 84, 87 and from the inverted output of the OR gate 88.

The counter 84, 86 start on a positive output from the respective digital comparators 85, 87 and stop when they reach a specific count. They will remain stopped until cleared by the next reset. The horizontal cursor counter 84 starts each time the horizontal position counter 59 is equal to the count latched by the latch 81 after the 2⅔ line delay provided by the delay element 79. The horizontal counter 84 is clocked by the same clock as the position counter 59. Following the output of the latch data signal from delay 79, the horizontal counter 84 will produce a pulse on decoded output 7 at the same horizontal position on all subsequent lines. The vertical counter 86 works in the same manner for the line count. Outputs 0 and 6 of each counter 84, 86 are ORed together by OR gate 88 and then AND-ed with the vertical cursor interval to form a black rectangle on the screen. The white output occurs whenever the square is "on" (defined as both vertical AND horizontal counters enabled (counting) AND NOT black output. The signal generator 89 thus generates the first line L1 of the cursor pattern shown in FIG. 6a, and then the subsequent lines L2 ... L6.

If the hand held device 16 is not moved, the next time the raster passes through the field of view of the optical sensor 16, the cursor generation will begin at the same point of the raster. If the position of the hand held device 16 has been adjusted, the latches 81,83 will latch a new starting position and the cursor will be generated beginning at this new starting position. Hence, the cursor 22 follows the position of the handheld device 16 as long as the latter points to some portion of the screen 18.

The handheld device 16 uses an optical pickup. In order to function correctly with the handheld device 16, the display screen 18 should be as light as possible with no black objects. This does not limit the subject matter, but rather requires attention to the contrast ratio during video production. The vertical signal should be adjusted to produce a minimum luminance signal of 10% of the white level. This consideration is operative only during those periods when the cursor is enabled.

The data high nibbles (four bits) from each latch 81, 83 form the new contents of the cursor position register 71. In an improved embodiment, two sets of latches could be used, one to contain the position transmitted to the processor 15 and another to contain position data from the processor 15, with the latter data actually controlling where the cursor is generated. The processor 15 would then execute a debounce or integrate routine to eliminate small variation or vibrations in the cursor position.

Two control lines 91, 93 are associated with the cursor logic. The first, 91, allows the cursor display to be turned on or off, and the second, 93, allows the cursor position to be held.

The data logic 44 (FIG. 7) consists of an eight stage shift register 95, clock control logic 97 and flag control logic 99. Data is stored on the tape 110 of the VCR 14 and is shifted into the register 95 over line 62 and through the data comparator 25 beginning with the first line following the equalizing period (line 10) (i.e., start bit on the tenth line, first frame after equalizing pulse begin audio, and the next nine lines contain the data). This timing is accomplished by the clock control 97 which gates clock pulses to the shift register 95 as determined by the vertical line count maintained by vertical line counter 57. The shift register 95 is shifted on each horizontal sync pulse. If the first data bit inputted to the shift register 95 is a "1" (white), the data flag is set in the processor 15 indicating that the processor should read the following data from the shift register 95. The data flag to the processor 15 from register stage 99 is reset over a line 101 when the data register 73 is addressed by the processor 15. If the first data bit inputted to the register 95 is zero (black), the processor interprets it as an indication that no valid data follows. Hence, the processor 15 does not read the data register 73.

The data format is further illustrated in FIG. 9. As shown, each bit occupies substantially an entire horizontal line period. This feature enables very reliable and inexpensive data extraction. In FIG. 9, the nested audio areas of the signal are indicated generally by the numeral 3.

Figure 8:
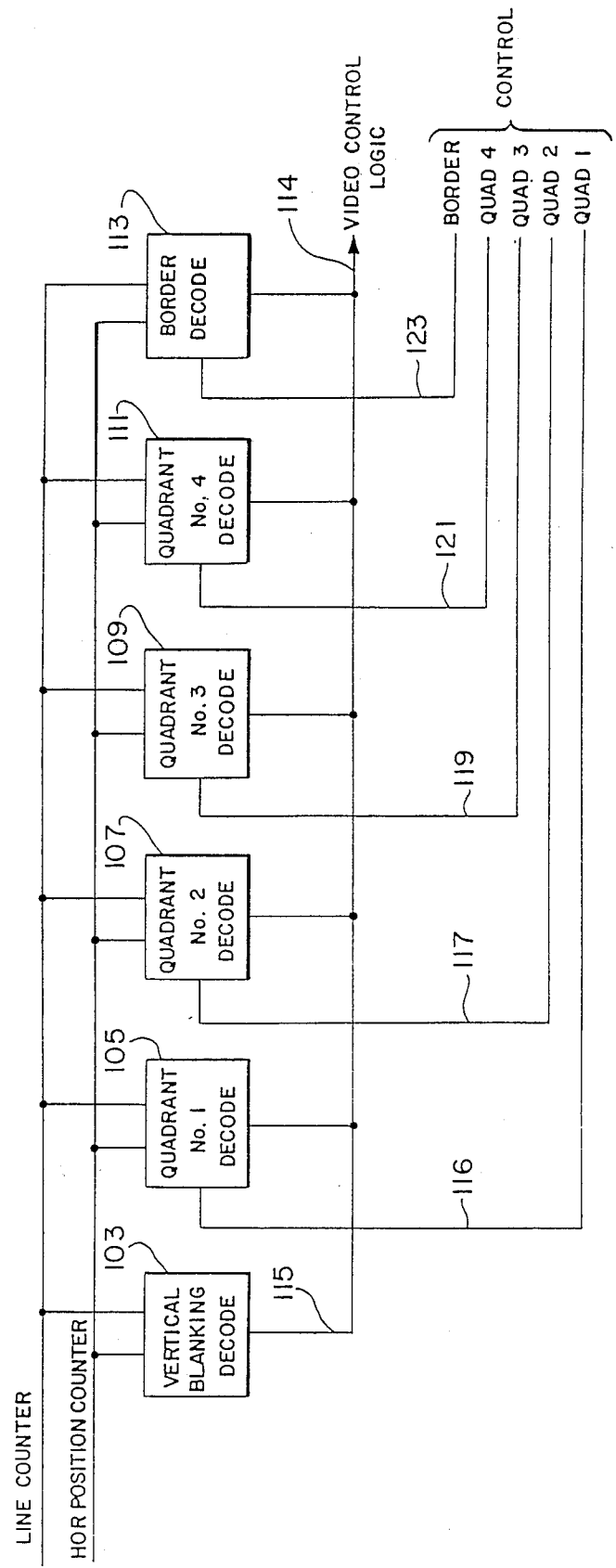
FIG. 8 is a circuit block diagram of the video blanking logic of the preferred embodiment.

The video blanking logic 57 (FIG. 8) is a series of decoders 103, 105, 107, 109, 111, 113 which decode the appropriate line and horizontal position counts for blanking the various sections of the screen 18. These decoders 103, 105, 107, 109, 111, 113 supply a control signal to the video control logic 51 on an output line 114. The output 115 of the vertical blanking decoder 103 is "on" during the period from the beginning of the first audio pulse 3a to the end of the fourth audio pulse 3d and is active from count 1 of the vertical line counter 57 through count 16. The output of the screen border decoder 113 is active during the periods of the auxiliary audio signals. The output of the quadrant 1 blanking decoder 105 is active from count 16 of the line counter 57 through count 122 and from horizontal count 88 through 292. The quadrant 2 decoder 107 is active from line count 16 through 122 and from horizontal count 291 through 496. The quadrant 3 decoder 109 is active from line count 121 through 261 and from horizontal count 88 through 292. The quadrant 4 decoder 111 is active from line count 121 through 261 and from horizontal count 291 through 496. The blanking function of decoders 105, 107, 109, 111, 113 is enabled by respective control signals on lines 116, 117, 119, 121 and 123 from the control register 67.

The audio logic 39 (FIG. 10) consists of a sample and hold switch 125, for decoding the four auxiliary audio channels, the three additional switches 127, 129, 131.

The positions of the auxiliary audio signals in the video signal are indicated on the timing diagram of FIG. 3. The sample windows are generated by the horizontal position counter 59 and gated by a vertical sync decoder 133. The windows are:

Audio 1 10–11 [10.25 to 10.75] microseconds, determined by decoder 135

Audio 2 11.5–12.5 [11.75 to 12.25] microseconds, determined by counter 137

Audio 3 60.5 to 61.5 [60.75 to 61.25] microseconds, determined by decoder 139

Audio 4 62 to 63 [62.25 to 62.75] microseconds, determined by decoder 141

The bracketed times indicate the interval actually sampled. The decoders are enabled by respective audio register bits ARB 0-3 from the control register 67. The three additional switches 127, 129, 131 connect (1) the main audio derived from the VCR sound track (2) a high level or (3) a low level to the audio output 143. Each of the three switches 127, 129, 131 is controlled by an individual bit from the audio control register 67, the latter two switches 129, 131 constituting a two step, processor-controlled volume control.

Figure 11:
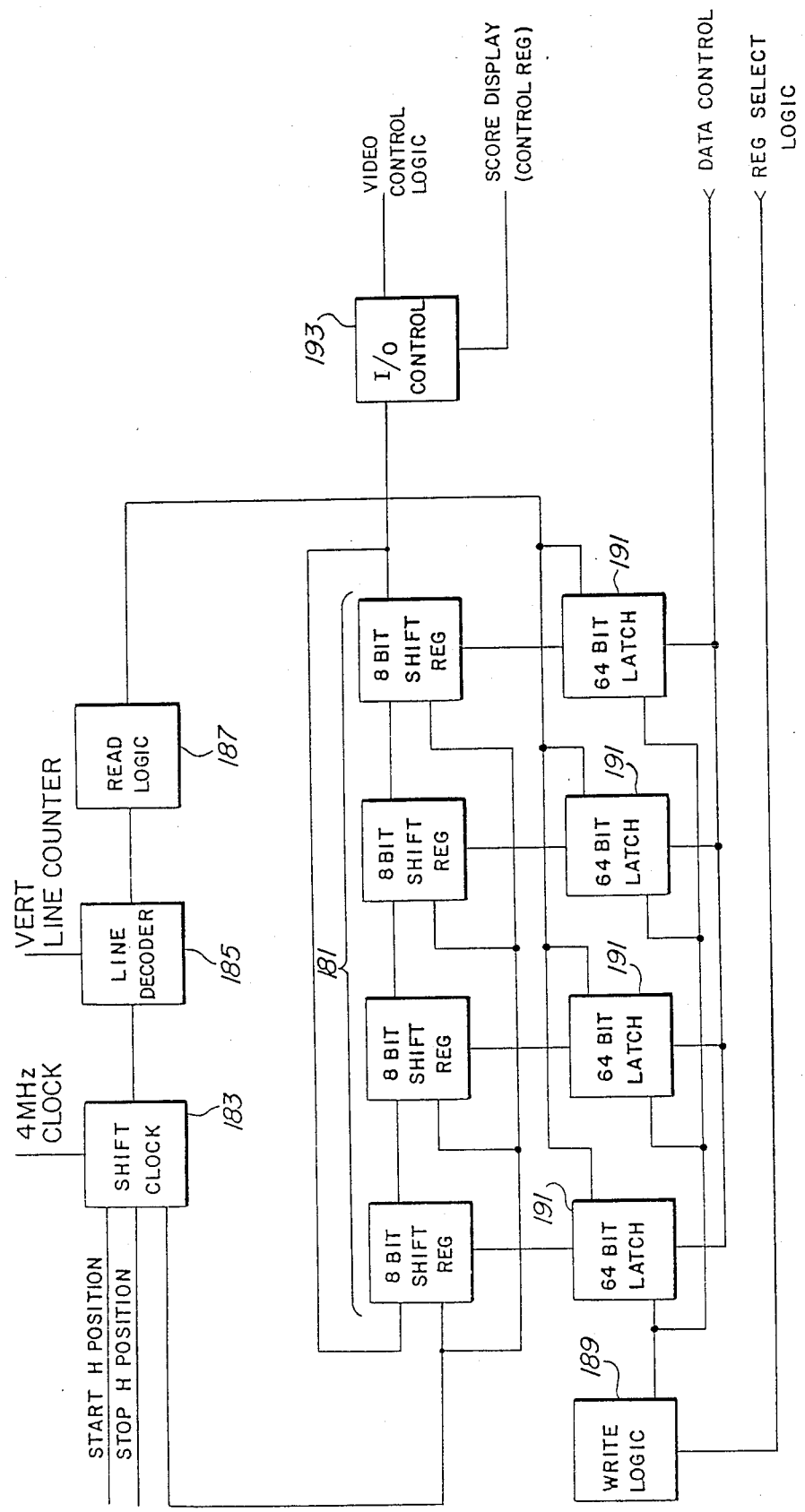
FIG. 11 is a block diagram of the score display logic of the preferred embodiment.

The score logic 53 of FIG. 11 includes a shift clock 183, line decoder 185, read logic 187, write logic 189 and four 64-bit latches 191. Operation of the score display logic 53 (FIG. 11) is straight forward. Data is loaded from the data registers 73 to a 32-bit shift register 181 and then shifted out under control of the horizontal position clock. At the end of a line, the next 32-bit byte is loaded and shifted out at the appropriate horizontal position. The display will begin at horizontal count 400 and be shifted at 4 MHz.

Score logic 53 may be provided to generate a block sized A×B pixels in upper right corner so that the processor 15 may take score data out of memory and place it into a shift register. Score logic 53 serves to sync each line to the raster for proper insertion in the designated score area.

Figure 12:
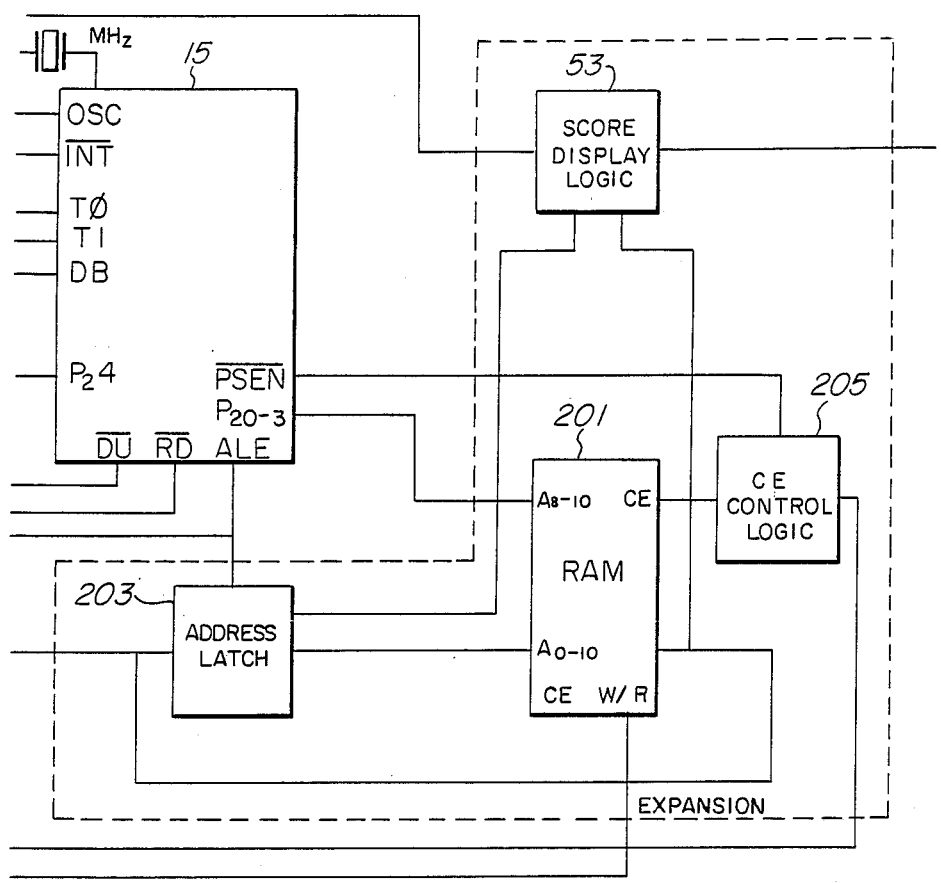
FIG. 12 illustrates expansion circuitry according to the preferred embodiment.

As alluded to above, the processor 15 is an eight-bit microcomputer, the Intel 8048. FIG. 12 indicates a 2k×8 random access memory RAM 201 which can be optionally included in the system, as well as an address latch 203, and control logic 205. The RAM can serve as program storage or as variable storage under software control. A program can be downloaded from the VCR 14, which would replace all of the internal program memory, and would allow the software designer total flexibility within the limits of the hardware. The design allows the RAM to be easily configured as an add-on module.

As indicated above, the decoder unit 12 is controlled by 8-bit serial data transmitted on the first nine lines after the vertical equalizing pulses. The unit 12 responds to a list of commands described in the following specification:

1.1 Commands: (xx) = Hex

| | |
|---|---|
| 0. Reset (00) | 16. Clear (10) |
| 1. Enable Selection (01) | 17. Disable Selection (11) |
| 2. Branch On Previous (02) | 18. |
| 3. Branch On Score (03) | 19. |
| 4. Enable Score (04) | 20. Disable Score (14) |
| 5. Border On (05) | 21. Border Off (15) |
| 6. Cursor On (06) | 22. Cursor Off (16) |
| 7. Score Display On (07) | 23. Score Display Off (17) |
| 8. Selection latch On (08) | 24. Selection Latch Off (18) |
| 9. Enable Tune (09) | 25. Disable Tune (19) |
| 10. Video Branching On (0A) | 26. Video Branching Off (1A) |
| 11. Sequential Mode On (0B) | 27. Sequential Mode Off (1B) |
| 12. Define Area 1 yes (0C) | 28. Define Area 1 no (1C) |
| 13. Define Area 2 yes (0D) | 29. Define Area 2 no (1D) |
| 14. Define Area 3 yes (0E) | 30. Define Area 3 no (1E) |
| 15. Define Area 4 yes (0F) | 31. Define Area 4 no (1F) |

1.2 Command Definition:
1.2.0 Reset:
Resets answer memory
enables score
turns border off
turns cursor on
turns score display off
turns selection latch on
enables tune
turns video branch mode off
turns sequential mode off
resets the 4 defined areas to no, 0,0,0,0.
and performs a clear command 1.2.1 Enable Selection: enables select button on controller 1.2.2 Branch On Previous: Branches audio (or both audio and video if video branching on) based on the last year selection.

1.2.3 Branch on Score: (two byte instruction) Causes a branch based on the number of incorrect responses made after a reset command. If zero incorrect, a branch is made as if a selection 1 has been made. The second byte defines the increments of incorrect responses required for other branches. If the second byte is 1, the branches will be:

| # incorrect | selection |
|---|---|
| 0 | 1 |
| 1 | 2 |
| 2 | 3 |
| 3 | 4 |
| 4 or more | 5 |

For a second byte of 2 the branches will be:

| # incorrect | selection |
|---|---|
| 0 | 1 |
| 1-2 | 2 |
| 3-4 | 3 |
| 5-6 | 4 |
| 7 or more | 5 |

For a second byte of 3 the branches will be:

| # incorrect | selection |
|---|---|
| 0 | 1 |
| 1-3 | 2 |
| 4-6 | 3 |
| 7-9 | 4 |
| 10 or more | 5 |

1.2.4 Enable Score: Enables score keeping counter 1.2.5 Border On: Turns on the screen border to mask auxiliary audio channels information from the viewer.

1.2.6 Cursor On: Enables the on-screen cursor generated by the sensor.

1.2.7 Score Display On: Displays 5 digit score in upper left corner of screen. (used only with expansion module)

1.2.8 Selection Latch On: Allows only one selection to be made per branch segment. Selection remains latched until clear command is received.

1.2.9 Enable Tune: Causes decoder to generate one of two hardware defined tunes based on the selection definition being "yes or no".

1.2.10 Video Branching Mode On: (two byte instruction) At the time of the disable selection command, causes blanking of non-selected area. The area and pattern are defined by the second byte. The second byte is divided into a format (D3 and D2) and an offset (D1 and D0)

The formats are:

| D3 | D2 | |
|---|---|---|
| 0 | 0 | four quadrants, all selectable |
| 0 | 1 | four quadrants, quadrant four always on. |
| 1 | 0 | two sections, right-left |
| 1 | 1 | two sections, top-bottom |

The offset is a number from 0 to 3 which in added to the selection number to locate the area to be displayed.

1.2.11 Sequential mode on: allows branch based on time of the selection button being pressed. Four branches are allowed, the selection counter is incremented by an enable selection instruction. Both the audio and video branch (if enabled) occur on execution of a disable selection. The second byte of the instruction specifies which answer is correct, the correlation between branches and the position in the sequence.

| Second byte | sequence # |
|---|---|
| 0 | 1,2,3,4 |
| 1 | 2,3,4,1 |
| 2 | 3,4,1,2 |
| 3 | 4,1,2,3 |

1.2.12 Define Area 1 yes: (five byte instruction) defines area of screen which causes an audio branch to track 1. Defines selection as #1 for Video Branching, increments correct score
Byte 2: Start of horizontal area
Byte 3: End of horizontal area
Byte 4: Start of vertical area
Byte 5: End of vertical area 1.2.13 Define Area 2 yes: (five byte instruction) defines area of screen which causes an audio branch to track 2. Defines selection as #2 for Video Branching, increments correct score.
Byte 2: Start of horizontal area Byte 3: End of horizontal area
Byte 4: Start of vertical area
Byte 5: End of vertical area

1.2.14 Define Area 3 yes: (five byte instruction) defines area of screen which causes an audio branch to track 3. Defines selection as #3 for Video Branching, increments correct score.
Byte 2: Start of horizontal area
Byte 3: End of horizontal area
Byte 4: Start of vertical area
Byte 5: End of vertical area

1.2.15 Define Area 4 yes: (five byte instruction) defines area of screen which causes an audio branch to track 4. Defines selection as #4 for Video Branching, increments correct score
Byte 2: Start of horizontal area
Byte 3: End of horizontal area
Byte 4: Start of vertical area
Byte 5: End of vertical area

1.2.16 Clear: Returns from branch. Audio channel 5 (main) is selected and the full screen is displayed. This command also resets the video branch to off, resets the sequential mode off, and turns the cursor on.

1.2.17 Disable Selection: disables select button This command terminates the answer period. The video branch is made at this time. If the sequential mode is enabled, the audio branch will also occured at this time.

1.2.18 Not used.

1.2.19 Not used.

1.2.20 Disable Score: Disables the score counter until the next clear command. Used in the same manner as Disable tune.

1.2.21 Border off: allows software to remove border, for full screen display. Audio branching is disabled.

1.2.22 Cursor off: allows software to disable cursor. Cursor is re-enabled by executing a "clear".

1.2.23 Score display off: Turns off score display. Used only with expansion module.

1.2.24 Selection latch off: allows software to enable multiple answers. Selection is latched until another selection is made. The last selection made prior to the disable selection command will be used for score keeping and branch selection for the explanation phase.

1.2.25 Disable Tune: Disables "correct/incorrect" tunes after selection is made. When disabled, the decoder produces a single tone when the select button is depressed. This command is used whenever a question does not have a right or wrong response but is merely a choice.

1.2.26 Video Branching Off: Turns video branching off Audio branching remains active.

1.2.27 Sequential Mode Off: Returns from sequential mode

1.2.28 Define Area 1 no: (five byte instruction) defines area of screen which causes an audio branch to track 1. Defines selection as #1 for Video branching. Increments incorrect response counter.
Byte 2: Start of horizontal area
Byte 3: End of horizontal area
Byte 4: End of vertical area
Byte 5: End of vertical area

1.2.29 Define Area 2 no: (five byte instruction) defines area of screen which causes an audio branch to track 2. Defines selection as #2 for Video branching. Increments incorrect response counter.
Byte 2: Start of horizontal area
Byte 3: End of horizontal area
Byte 4: Start of vertical area
Byte 5: End of vertical area

1.2.30 Define Area 3 no: (five byte instruction) defines area of screen which causes an audio branch to track 3. Defines selection as #3 for Video branching. Increments incorrect response counter.
Byte 2: Start of horizontal area
Byte 3: End of horizontal area
Byte 4: Start of vertical area
Byte 5: End of vertical area

1.2.31 Defines Area 4 no: (five byte instruction) defines area of screen which causes an audio branch to track 4. Defines selection as #4 for Video branching. Increments incorrect response counter.
Byte 2: Start of horizontal area
Byte 3: End of horizontal area
Byte 4: Start of vertical area
Byte 5: End of vvertical area The preferred embodiment is a question/response device, with the response being software programmable. The following discussion illustrates several types of question/response formats and the sequence of commands derived from the pre-recorded video tape of the VCR 14, required to produce the desired response.

MULTIPLE CHOICE FORMAT

One format is a multiple choice format, with audio branching only. In this format there is a preamble during which a question or choice is raised, a description of the required action is made, a question posed, a period of time to make a selection allotted, and a response made based on the user input.

A sample script might read as follows: Narrator: How good are you at identifying farm animals . . . I'm going to show you a picture of a barnyard and ask you to pick out an animal. Let's find the cow first. When you point the sensor at the screen, a little white square will appear on the screen. Move the square over the animal you think is the cow and press the button.

CUT TO BARNYARD containing a cow, pig, and a horse: barnyard background sounds. At the time the button is pressed, the unit 12 executes a branch to one of the five audio tracks available.

Audio #1: (if cursor in area defined as "cow") You are right, that is the cow.

Audio #2: (if cursor in area defined as "pig") That was the pig, better luck next time.

Audio #3: (if the cursor in area defined as "horse") Close, but that is a horse.

Audio #4: (if button pushed, but cursor not in any of the above areas) You have to point more carefully, I didn't understand.

Audio #5: (Main audio): I can't tell what you're thinking, you need to point and push the button.

Narrator: Discusses the attributes of a cow.

The above question/response can be tailored to any age group, and is intended to verbalize the multiple choice mode.

The sequence of program commands required to implement the foregoing script is:

1. Reset: This command resets the decoder 12 to the initial starting conditions. For a more detailed description refer to section 1.2.0 and 1.2.16.

2. Define #1 yes: This command is used to set the screen position of object number 1 and indicate area 1 is a correct response. Note that the screen is divided into 256 zones, 16 horizontally and 16 vertically. The target area is defined by 4 sets of numbers (0–15) which define a rectangular area of the screen. The numbers define the starting and ending point horizontally and vertically. The code 0,1,0,1 set the target to the upper left hand corner of the screen, while 0,15,0,15 would define the entire screen. Thus, it can be seen that up to 256 "window shades" can be placed over, and hide, background VCR video (pictures) in any combination, such as 4×4 quadrants, etc.

3. Define #2 No: This sequence of commands defines the second object and also specifies that the area is an incorrect response. It is important to note that the areas defined may overlap. When a decision is latched by the decoder (when the button is depressed), the microprocessor 15 will determine if the cursor position is within the area of object 1,2,3, or 4 in that order. If, for example, the cursor is pointed to an area which is within both 1 and 2, the unit will select #1.

4. Define #3 no: Defines object #3 and specifies the area as an incorrect response.

5. Define #4 no: Defines object #4. In the above example, object #4 is the full screen and is also defined as an incorrect response. To transmit the above list of commands will require approximately 0.35 seconds. These commands may be loaded on the pre-recorded VCR tape 110 at any time during the lead-in to the question. It is desirable that the commands be as close as possible to the enable selection command to avoid incorrect responses if the tape is rewound to repeat the question. It is also recommended that each segment be preceded by at least 5 reset or clear commands, in case the VCR 14 is stopped during the playback of a multi-word command. It is not required to load areas which are not used.

6. Enable Selection: This command allows the button 20 on the sensor 16 to select a target. Normally, the selection is latched, until the next clear command. If this is not desired, and the software designer would like to allow several choices, a Selection Latch Off command is inserted into the tape, prior to the enable selection command.

During the selection period the objects can move but must remain within the selection area defined above. It is possible to redefine a target area at any time, however, it will take on the order of 0.083 seconds to down load new data.

If the button 20 is pushed during the selection period, the decoder 12 will:

(A) latch (hold) the last cursor position, and the cursor will blink.

(B) Play an audible tune through the T.V. speaker by programming in the "Enable Time" command. This tune will be "correct" song is the selected area is designated as correct, and an "incorrect" tune is not. The tunes are hardware defined, not software programmable. If these tunes are not desired, they can be disabled by encoding a "Tune Off" command during the preamble to the question.

(C) Branch to the audio track determined by the area definition statements.

(D) Increment the internal score keeping register based on the area definitions. This action can be disabled by encoding a "Disable Score" command.

In most cases, all 5 audio tracks will contain the same audio, until the end of the selection period, at which time the explanations are given.

6. Disable Selection: This command disables the select button and is inserted to prevent an audio branch during the explanation phase.

7. Clear: This command returns the audio to channel 5 and terminates the branch.

The multiple choice format can be used for as few as one choice, such as might be used in a sound matching type of question. In this case the correct response would be to press the select button 20 or not press the select button 20.

A correct segment is coded with:
1. a clear command
2. 'define area 1 yes 0,15,0,15 (full screen)
3. enable select
4. 'disable select
5. 'clear An incorrect segment uses the "Define Area 1 No" command as follows:
1. clear command
2. define area 1 no 0,5,0,15 (full screen)
3. enable selection
4. disable selection
5. clear

VIDEO BRANCHING FORMAT

Another format available in the Video Branching Format (branching audio and pseudo branching video): The video branching format operates in the same manner as the multiple choice format but allows the video to perform a pseudo branch as well. This is accomplished by blanking (placing "window shades" over) those quadrants of the screen not related to the choice made by the viewer.

Using the same script example as above, an explanation may be presented as to why answers were right or wrong, pointing out the differences between the operator's choice and the correct response, as before, but displaying appropriate quadrant—sized visuals.

The commands are the same as in the initial example with the addition of a "Video Branch Mode On" command and would be:
1. clear
2. define area 1 yes
3. define area 2 no
4. define area 3 no
5. define area 4 no
6. video branch mode on
7. enable selection
8. disable selection
9. clear The Video Branch Mode On command has several options, which allow the screen to be blanked in several ways.

The first is four quadrants. In this mode, only one quadrant is unblanked at any one time, the area being defined by the selection will be displayed in the following manner: selection 1 top left, selection 2 top right, selection 3 bottom right, and selection 4 bottom left. If no selection is made the entire screen will be blanked.

The above command may be modified by specifing an offset between 0 and 3. This offset is added to the selection number to determine the area displayed. If the selection were 2 and the offset 1, the bottom right quadrant would be displayed.

The second is four quadrants with quadrant 4 always on. This is used if the software designer would like to have a continuous video display for prompting. This command is also altered by specifying an offset. The offset changes both the selection and the position of the prompting quadrant.

The third possibility is a vertically split screen. In this mode the left side of the screen is defined as choice 1 and the right side as choice 2. If an odd offset is used, the right side will be displayed on selection 1.

The fourth option allows the screen to be split horizontally with the top defined as selection 1 and the bottom defined as selection 2. If an odd offset is used, the bottom of the screen will be displayed on selection 1.

The screen is blanked as soon as the disable selection command is received and remains blanked until the clear command is received. As in the standard multiple choice format, the audio is branched to the selection number at the time the selection is made.

SEQUENTIAL FORMAT

Another available format is a sequential format. The sequential format does not require the cursor 22. In this format the answers to a question are presented serially. The user presses the select button during the time the correct response is shown, and the branch is then made at the end of the segment (when the disable selection command is given).

The sequence of commands is:
1. clear
2. sequential mode on
3. enable selection
4. enable selection
5. enable selection
6. enable selection
7. 'disable selection
8. clear Each time the enable selection command is encountered the choice counter is incremented. Part of the sequential mode command specifies which answer is correct. Sec. 1.2.11 above.

The preferred embodiment provides a method of score keeping which is activated by commands encoded on the video tape 110.

The "Branch On Score" command is a directed branch based on the number of incorrect selections made after the last reset command. A second part of the instruction specifies the range associated with each branch. Refer to section 1.2.3. for further explaination.

The Branch On Score command can include both audio and video branching and follows the same type of format except that the user's score determines the branch rather than the user's response. A typical command sequence would be:
1. clear
2. branch mode on
3. branch on score
4. reset Each audio track would contain specifics relating to the score such as "Perfect, you got them all," while the screen would display a quadrant with a gold medal, etc. This function is entirely software definable within the 5 audio and 4 video branch limitation.

There are several additional commands which are available to the software designer.

The first set of commands are the Latch Mode On and Latch Mode Off commands. These commands typically precede a branch. If the Latch Mode Off command is given, the cursor 22 will remain under user control, and the audio and video branches will be based on the last cursor position selected before the disable selection command is received. This allows the user to make many choices. The "yes" or "no" tune is played at the time of selection but both audio and video branches will not occur until the disable selection command is received. Score keeping is based on the last selection made. The function is cancelled by a Clear or a Reset command.

The second set of commands allows the software designer to control the cursor 22. It may be desirable during certain portions of a presentation to disable the cursor 22. The cursor 22 may be turned "on" or "off" with the appropriate command. The cursor 22 is turned "on" after a reset or clear command.

The third set of commands allows the border to be controlled when the 4 additional audio channels are present. As the audio channels occur only during branches, this command allows the software designer to eliminate the border when it is not required and re-establish it when needed. A reset or clear command will turn the border off.

The exact sequence of commands used to set-up the system for a specific question or branching segment is not important. Each command will be executed on the completion of transmission and should be synchronized to the visual display. In practice, the software designer should provide a list of the commands required for a particular branching segment.

Figure 13:
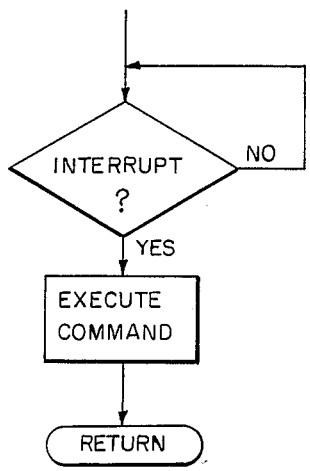
FIG. 13 is a flowchart related to operation of the preferred embodiment.

The programming of the processor 15 is straight forward, being designed primarily to execute the commands described above. As indicated in FIG. 13, the main program loops, awaiting an interrupt from the circuitry of FIG. 7 to indicate to it that new digital commands are present. After the processor 15 is interrupted, it retrieves the command, and the program jumps down to a routine for executing the command.

As discussed above, areas are "defined" on the screen for specific modes of operation by encoding appropriate commands on the video tape played back by the VCR 14. The VCR program further determines the timing of an audio-only branch, the timing of a video branch, and the format of the video branch. A command is also programmed onto the tape and executed which enables the processor 15 to detect button depression. After execution of this command, the button 20 is active. Thus, the Enable command is inserted in the tape at a very precise point, corresponding to the video frame upon which a selection is to be made. When that screen display disappears, the button 20 is disabled by the appropriate "Disable Selection" command, and a video branch is made based on the selection indicated by the location of the cursor 22 upon depression of the button 20.

Thus, processor 15 decides which command in the software specification has been received through the register 95 and activates appropriate circuity for executing the command. When the processor 15 receives "00", it performs a reset, and initializes conditions. If the processor 15 receives a "1", it executes the command which follows as defined in the software specification above. The commands are executed immediately in real time and do not require any significant amount of execution time to execute. Hence, the commands are placed on the VCR tape 110 at the time they are to occur. Once a command is executed, the processor 15 typically returns to its looping mode.

For example, after executing the ENABLE BUTTON command, the processor 15 waits for new data or depression of the button 20. If the button 20 is triggered, the processor 15 latches the position of the cursor 22 and compares it to one of the four positions defined on the screen 18 by the instructions contained on the video tape 110.

Assume the sensor 16 is pointed to area one, corresponding to audio channel one. When the button 20 is depressed, the processor 15 sets the audio reg bit 1 (FIG. 10), causing the audio corresponding to area one to be played. (Branching is independent of whether the answer is right or wrong.) In such a case, the audio going into the television receiver 32 comes from the first channel. The processor 15 then waits for the next command. The next command which should be supplied from the tape 110 is a "disable selection"—no longer able to make choices—and do a video branch. The processor 15 then activates all but one of the Quad control signals (FIG. 8) to blank various areas on the screen. This blanking will continue until the processor 15 gets a "clear" command, which says "return to the main audio channel, and return the screen to full." In such a case, the processor 15 responds by activating the appropriate audio and video control signals. Additionally, after the button 20 is pressed, the processor 15 will play the correct tune if the answer is correct, and a "wrong tune or message" if the viewer's selection is incorrect. This step is software controllable in the sense that it maybe skipped by putting a command in the video tape 110 which instructs the processor 15 not to play a message.

The processor 15 also accumulates a score by counting the number of wrong answers and may also execute a branch-on-score command. For example, the processor 15 may decide which of the five possibilities is correct and may produce responses such as "you missed between 7 and 9."

What is claimed is:

1. A method of encoding multiple audio and digital signals into a video signal having a plurality of displayable video areas, each area comprising substantially the entire period between a pair of horizontal sync pulses, comprising the steps of:
   sampling the audio signals to produce a set of samples;
   amplitude modulating said samples onto sampling pulses;
   placing the amplitude modulated sampling pulses into a portion of each of a plurality of said displayable video areas; and
   encoding digital commands in the form of bits in the video signal, one bit occupying substantially the entire portion of a selected one of said displayable video areas not allotted to the amplitude modulated sampling pulses.

2. The method of claim 1 wherein the video signal comprises:
   a horizontal synchronization pulse;
   a color burst following the horizontal synchronization pulse;
   a first return to median level interval following the color burst;
   a first audio carrier pulse modulated above and below and said median level;
   a second return to median level interval;
   a second audio carrier pulse modulated above and below said median level;
   a third return to median level interval;
   a picture video signal following the third return to median level interval;
   a fourth return to median level interval following the picture video signal;
   a third audio carrier pulse modulated above and below said median level;
   fifth return to median level interval;
   a fourth audio carrier pulse modulated above and below said median level;
   a sixth return to median level interval; and
   a horizontal synchronization pulse following the sixth return to median level interval 3. A method of encoding multiple audio signals represented by an audio waveform into a video signal having vertical sync intervals and a displayable video area located between a pair of horizontal sync pulses, comprising:
   tapering the envelope of the audio waveform to a zero signal level near said vertical sync intervals;
   encoding said audio signals by sampling the audio waveform to produce a set of samples;
   amplitude modulating said samples onto sampling pulses; and
   placing the amplitude modulated sampling pulses into said displayable video area.

4. A method of encoding multiple audio and digital signals into a video signal having a plurality of displayable video areas, each displayable video area being located between a pair of horizontal sync pulses and recovering said audio and digital signals, comprising:
   sampling the audio signals to produce a set of audio samples;
   amplitude modulating said audio samples onto sampling pulses, each sampling pulse occupying a pulse interval;
   placing the amplitude modulated sampling pulses into said displayable video areas;
   encoding digital commands into selected ones of said displayable video areas;
   recovering the audio signal by sampling the encoded video signal during the pulse interval to produce a sample value and holding the sample value;
   digitizing the encoded video signal to form a digital signal;
   identifying a said digital command in the digital signal;
   extracting the digital command from the digital signal; and
   storing the extracted digital command.

* * * * *